United States Patent
Surdu

(10) Patent No.: US 10,108,800 B1
(45) Date of Patent: Oct. 23, 2018

(54) ARM PROCESSOR-BASED HARDWARE ENFORCEMENT OF PROVIDING SEPARATE OPERATING SYSTEM ENVIRONMENTS FOR MOBILE DEVICES WITH CAPABILITY TO EMPLOY DIFFERENT SWITCHING METHODS

(71) Applicant: Oleksii Surdu, Broadlands, VA (US)

(72) Inventor: Oleksii Surdu, Broadlands, VA (US)

(73) Assignee: GBS Laboratories, LLC, Herndon, VA (US)

( * ) Notice: Subject to any disclaimer, the term of this patent is extended or adjusted under 35 U.S.C. 154(b) by 140 days.

(21) Appl. No.: 15/402,282

(22) Filed: Jan. 10, 2017

(51) Int. Cl.
*G06F 21/57* (2013.01)
*G06F 21/60* (2013.01)

(52) U.S. Cl.
CPC .......... *G06F 21/575* (2013.01); *G06F 21/604* (2013.01); *G06F 2221/033* (2013.01)

(58) Field of Classification Search
CPC . G06F 21/575; G06F 21/604; G06F 2221/033
USPC .......................................................... 726/1
See application file for complete search history.

(56) References Cited

U.S. PATENT DOCUMENTS

| | | | |
|---|---|---|---|
| 4,253,145 A | 2/1981 | Goldberg | |
| 4,626,986 A | 12/1986 | Mori | |
| 7,356,677 B1 | 4/2008 | Rafizadeh | |
| 8,042,117 B2 | 10/2011 | Ohta et al. | |
| 8,375,221 B1 | 2/2013 | Thom et al. | |
| 9,749,294 B1* | 8/2017 | Marquardt | .......... H04L 63/0272 |
| 2001/0018717 A1 | 8/2001 | Shimotono | |
| 2007/0055856 A1* | 3/2007 | Zimmer | ................ G06F 9/4403 713/2 |
| 2009/0204801 A1 | 8/2009 | Smith et al. | |
| 2015/0188949 A1* | 7/2015 | Mahaffey | ................ H04L 63/20 726/1 |

OTHER PUBLICATIONS

ARM, "ARM Cortex—A9 Technical Reference Manual, Revision: r4p1", 2016.
ARM, "ARM® Architecture Reference Manual, ARMv7-A and ARM v7-R edition", 2014.
ARM, "CoreLink TrustZone Address Space Controller TZC-380 Technical Reference Manual, Revision r0p1", 2010.

(Continued)

*Primary Examiner* — Harunur Rashid
*Assistant Examiner* — Angela R Holmes
(74) *Attorney, Agent, or Firm* — Capitol City TechLaw, PLLC; Jasbir Singh

(57) ABSTRACT

Using an ARM processor, a method is provided for endpoint computing systems such as mobile devices or laptops to provide a hardware isolated runtime environment for multiple operating systems (OS's). OS isolation is performed by hardware ARM Security Extensions added to ARMv6 processors (or higher) and controlled by a software Secure Monitor Module (SMM). The invention therefore comprises hardware enforcement mechanisms configured by the SMM to confine each OS to its own respective resources (kernel, RAM, drivers, storage). The invention is applicable to systems with different OS switching mechanisms, such as full computer system reboot to switch OS's, suspension of one OS and resuming another, or using a virtual machine hypervisor to execute several OS's in parallel.

12 Claims, 7 Drawing Sheets

Domain Separation

(56) References Cited

OTHER PUBLICATIONS

ARM, "PrimeCell Infrastructure AMBA 3 TrustZone Protection Controller (BP147), Revision: r0p0, Technical Overview", 2004.
Freescale Semiconductor, Inc., "i.MX 6Dual/6Quad Applications Processor Reference Manual, Rev. 3, Jul. 2015", 2015.
ARM, "ARM Cortex-A9 Technical Reference Manual, Revision: r4p1", 2016.

* cited by examiner

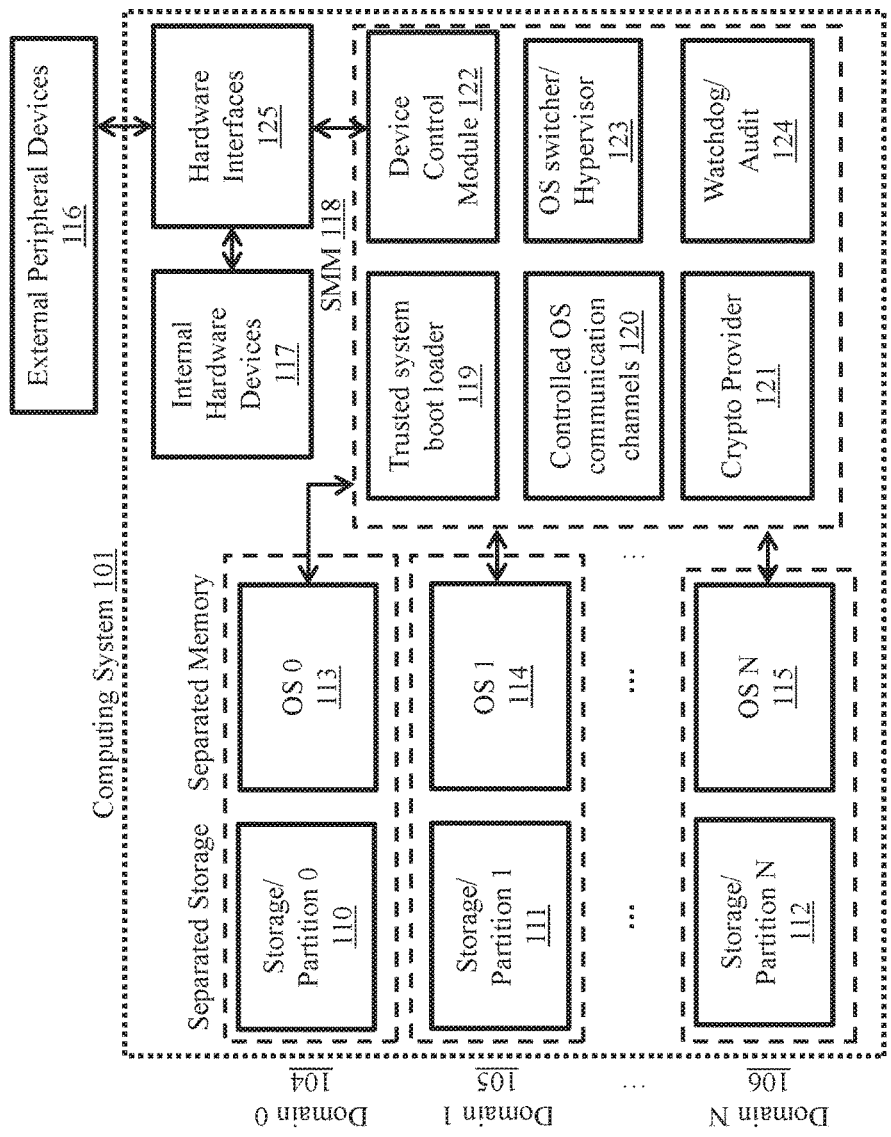
Fig. 1 Domain Separation

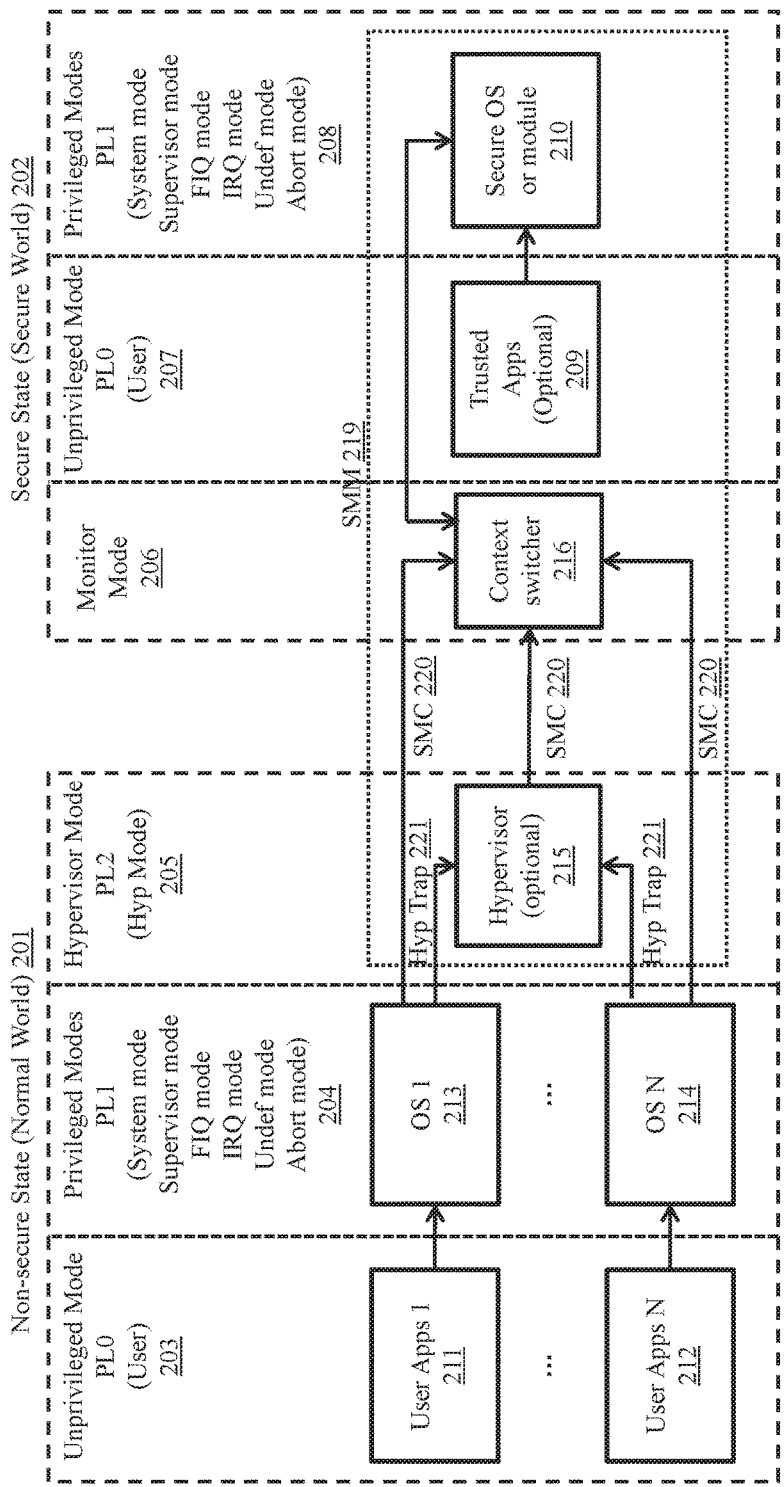
Fig. 2 (background art) ARM Processor Privilege Levels

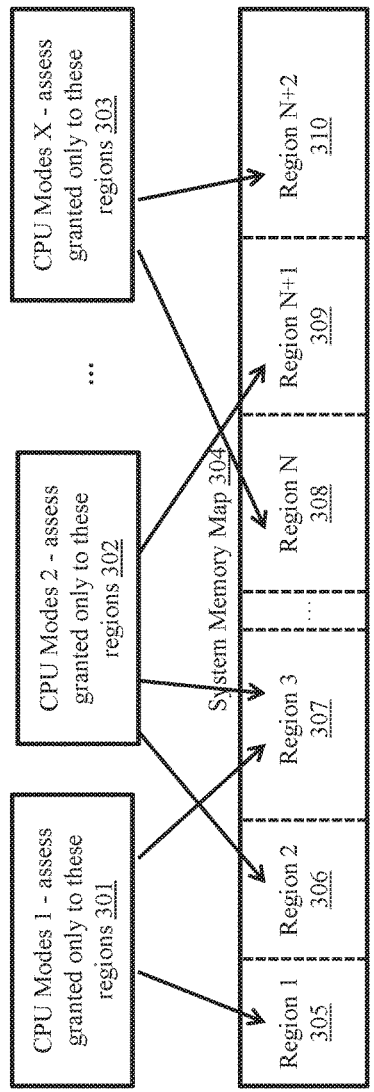
Fig. 3 (background art) Memory Access Control

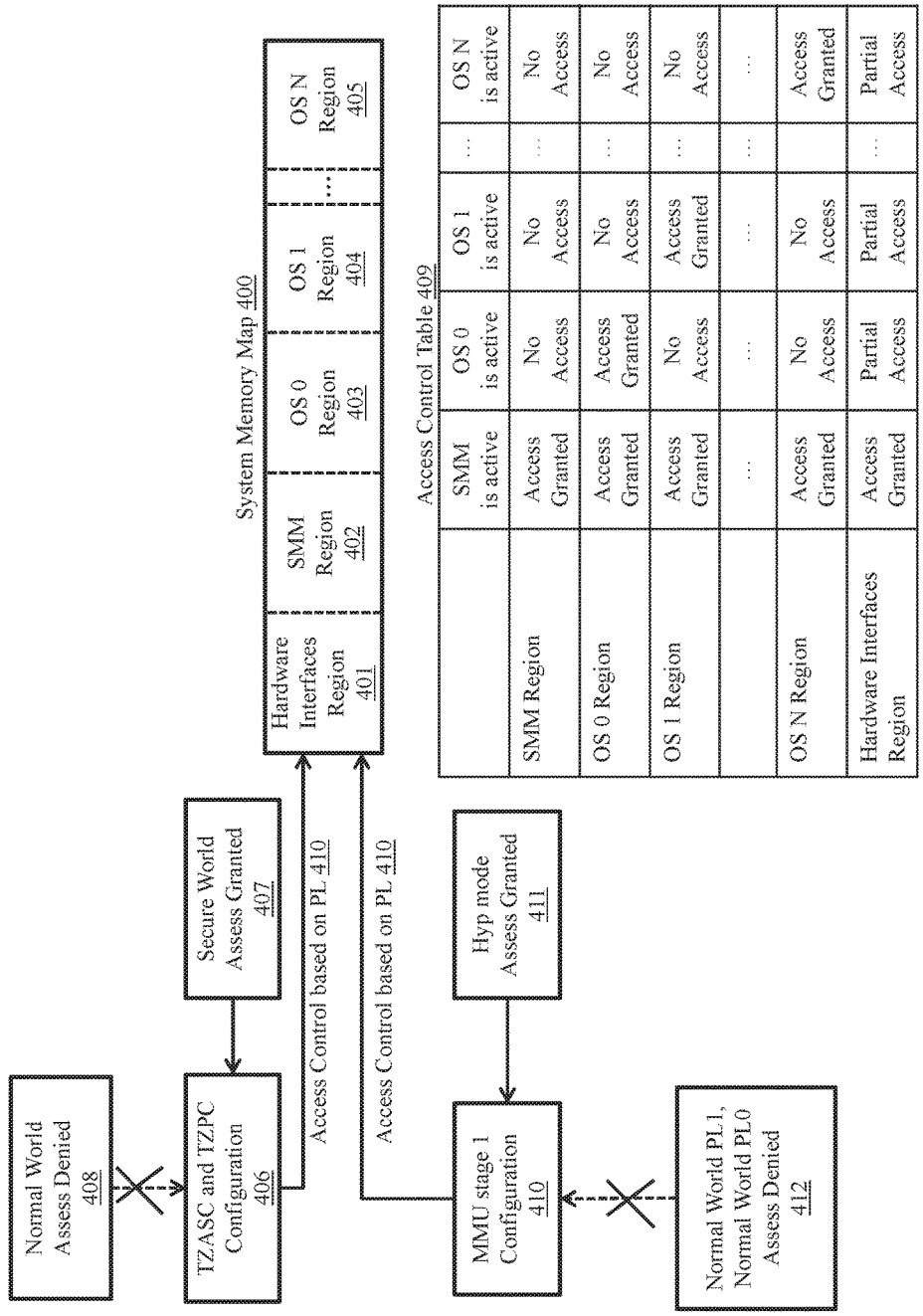
Fig. 4 System Memory Isolation Between OSs

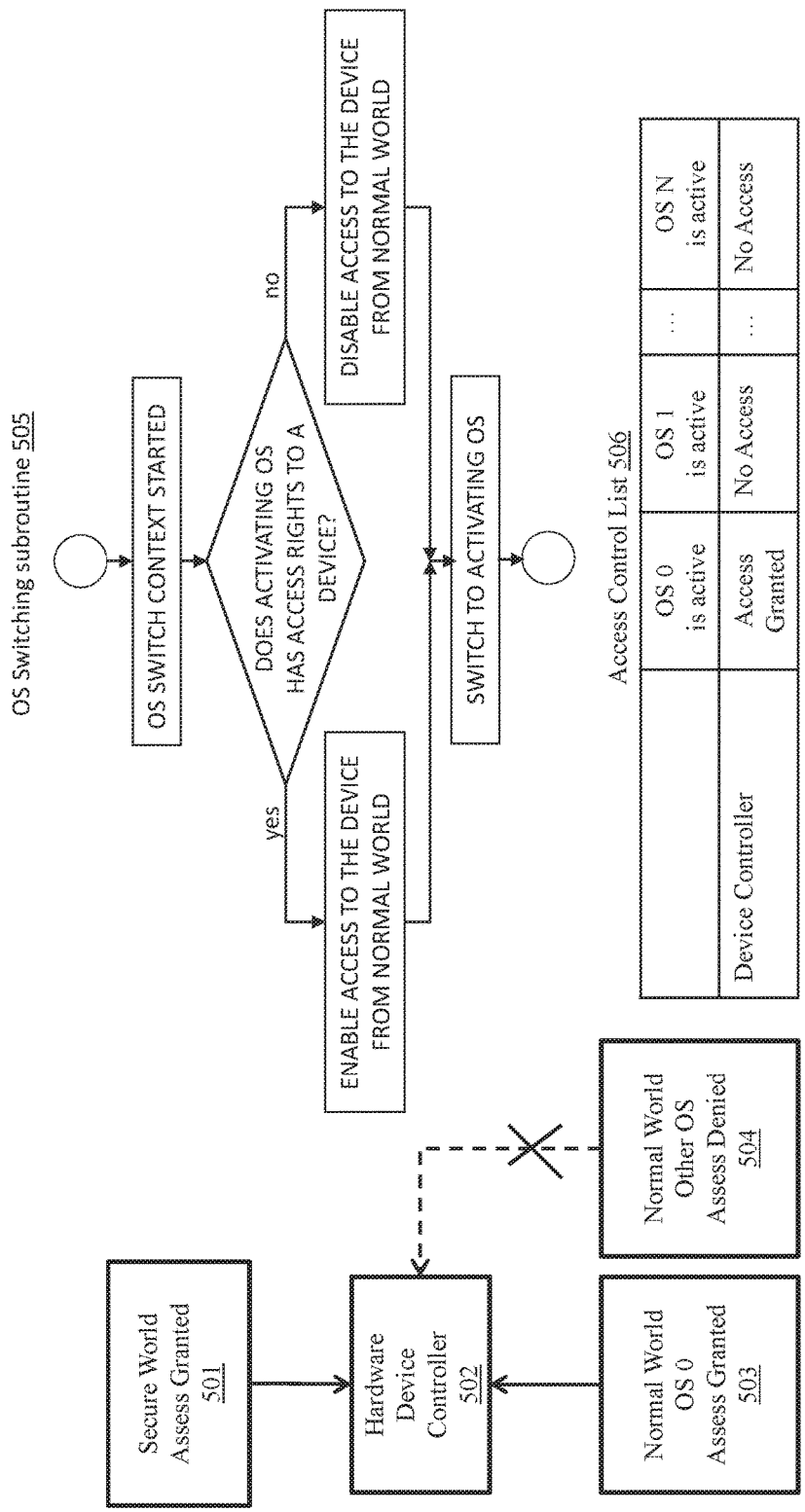

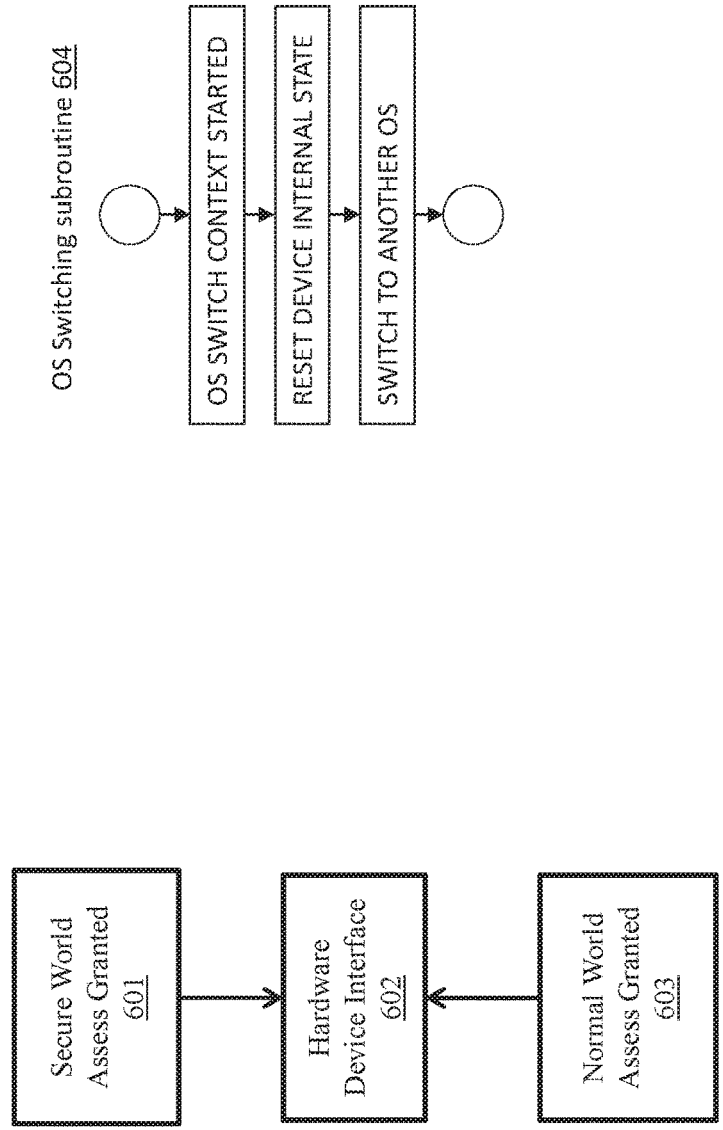
Fig. 6 Sequential Direct Hardware Access

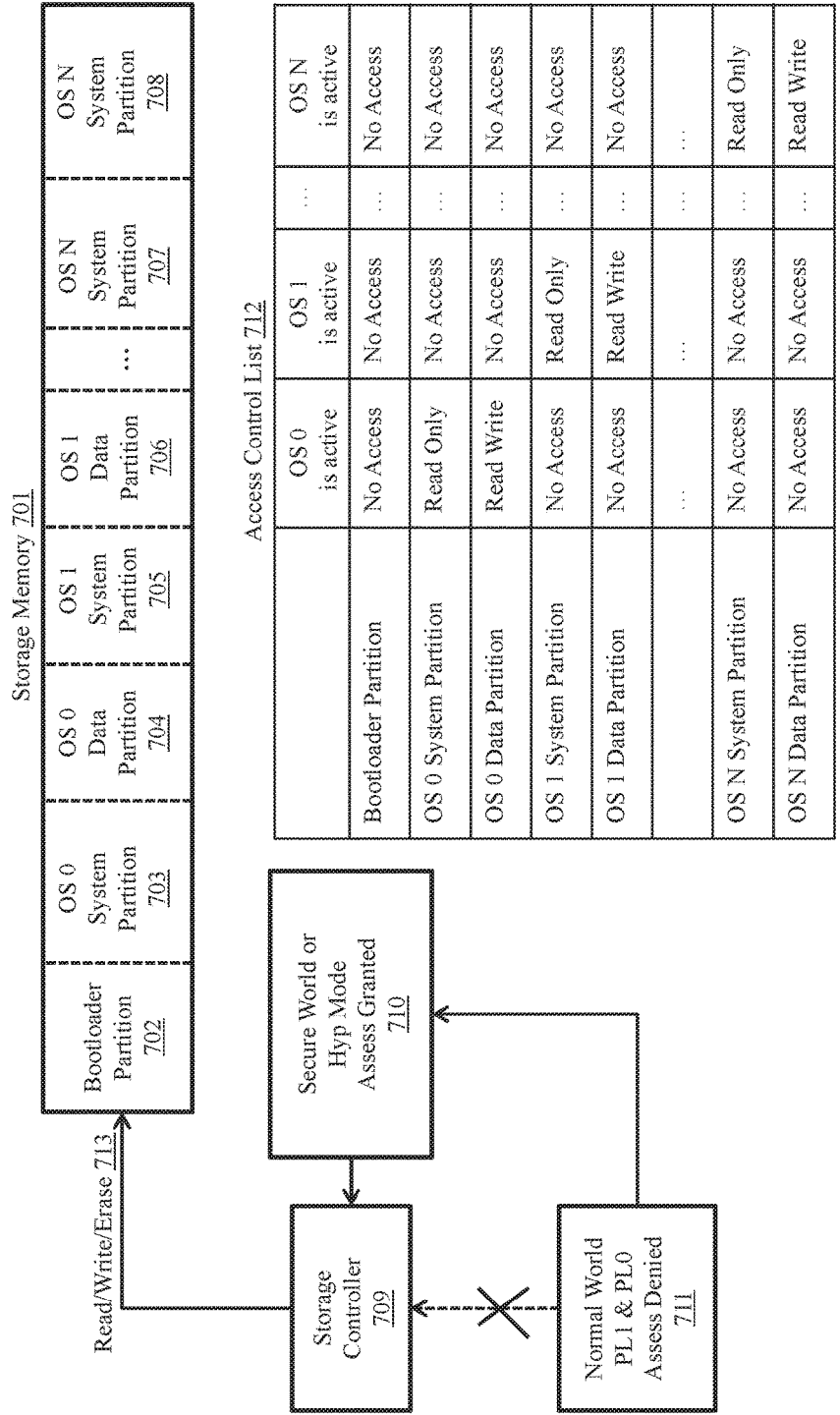

ARM PROCESSOR-BASED HARDWARE ENFORCEMENT OF PROVIDING SEPARATE OPERATING SYSTEM ENVIRONMENTS FOR MOBILE DEVICES WITH CAPABILITY TO EMPLOY DIFFERENT SWITCHING METHODS

FIELD OF THE INVENTION

The present invention generally relates to data security protection on mobile devices, and in particular security methods generally considered as "dual persona" to connote separation of execution environments in order to protect data in one environment from malware that may enter another execution environment.

RELATED ART

The following references identify related art:

Schumann Rafizadeh (U.S. patent Ser. No. 07/356,677B1) COMPUTER SYSTEM CAPABLE OF FAST SWITCHING BETWEEN MULTIPLE OPERATING SYSTEMS AND APPLICATIONS.

Ken Ohta (U.S. patent Ser. No. 08/042,117B2) OPERATING SYSTEM SWITCHING CONTROL DEVICE AND COMPUTER SYSTEM.

Susumu Shimotono (Application 20010018717) COMPUTER SYSTEM, OPERATING SYSTEM SWITCHING SYSTEM, OPERATING SYSTEM MOUNTING METHOD, OPERATING SYSTEM SWITCHING METHOD, STORAGE MEDIUM, AND PROGRAM TRANSMISSION APPARATUS.

Phillip Smith (Patent US20090204801A1) MECHANISM FOR SECURE DOWNLOAD OF CODE TO A LOCKED SYSTEM.

Shosuke Mori (U.S. Pat. No. 4,626,986A) Processor having plural initial loading programs for loading different operating systems.

Robert P. Goldberg (U.S. Pat. No. 4,253,145A) Feb. 24, 1981 Hardware virtualizer for supporting recursive virtual computer systems on a host computer system.

Stefan Thom (U.S. Pat. No. 8,375,221B1) FIRMWARE-BASED TRUSTED PLATFORM MODULE FOR ARM PROCESSOR ARCHITECTURES AND TRUSTZONE SECURITY EXTENSIONS.

ARM Architecture Reference Manuals:
infocenter.arm.com/help/index.jsp?topic=/
com.arm.doc.ddi0406c/index.html ARM Cortex-A series processor Technical Reference Manuals:
infocenter.arm.com/help/index.jsp?topic=/
com.arm.doc.ddi0388e/index.html CoreLink TrustZone Address Space Controller TZC-380 Technical Reference Manual:
infocenter.arm.com/help/index.jsp?topic=/
com.arm.doc.ddi0431c/index.html PrimeCell Infrastructure AMBA 3 TrustZone Protection Controller Technical Overview:
infocenter.arm.com/help/index.jsp?topic=/
com.arm.doc.dto0015a/index.html i.MX 6Dual/6Quad Applications Processor Reference Manual:
cache.freescale.com/files/32bit/doc/ref_manual/
IMX6DQRM.pdf?fasp=1&WT_TYPE=
Reference%20Manuals&WT_VENDOR=
FREESCALE&WT_FILE_FORMAT=pdf&WT_
ASSET=Documentation&fileExt=.pdf

BACKGROUND OF THE INVENTION

The proliferation in recent years in the popularity of mobile devices has carried with it an increasing risk of infection, often through cybercrime instigated through phishing or other end user attack intended to deceive the user into allowing access to sensitive data. A variety of exploit modes is used, for example, spoofed work-related emails, spoofed social media emails with malicious links, "likejacking," "clickjacking" and so forth.

The current state of the art offers "dual persona" methods that separate data segments and seek to prevent one segment from accessing another. These have been shown to be ineffective when malware is able to gain privileges to roam within the device and even access network data, which can lead to large-scale enterprise breach.

A method is needed to provide uncompromising data separation within a device, which is now provided by the present invention.

FIG. 2 (background art) illustrates ARMv6 and greater processors Privilege Levels (PL), processor modes and types of software running with corresponding privileges (see ARM Architecture Reference Manuals). The ARM CPU architecture supports multiple PL that number from the lowest PL, the Non-secure state PL0 (203) that is often described as Unprivileged or User mode.

Every memory access has corresponding access privilege. For example, software executing at PL0 privilege level makes only unprivileged memory accesses. Memory access is configured through ARM Memory Management Unit (MMU) (see ARM Cortex-A series processor Technical Reference Manuals), TrustZone Address Space Controller (TZASC) (see CoreLink TrustZone Address Space Controller TZC-380 Technical Reference Manual) and TrustZone Protection Controller (TZPC) (see PrimeCell Infrastructure AMBA 3 TrustZone Protection Controller Technical Overview) or through vendor specific Security Extension hardware modules, for example Central Security Unit (CSU) in iMX6 Freescale processor (see i.MX 6Dual/6Quad Applications Processor Reference Manual).

Software executing at privileged modes in the Non-secure state PL1 (204) can access most features of the ARM processor, and can change the configuration settings for those features, except for certain features added by the Virtualization and Security Extensions that are only accessible at PL2 or in Secure state.

Software executing at PL1 makes privileged memory accesses by default, but can also make unprivileged access.

The Virtualization Extensions further extend the processor architecture to provide virtualization capabilities. Software executing at PL2 in Hyp mode (205) can perform all of the operations accessible at PL1, and can access additional virtualization functionality. PL2 mode is normally used by a hypervisor (215) that controls, and can switch between OS's (213-214), that execute at PL1.

Some of the ARM processor implementations do not include the Virtualization Extensions and have only two privilege levels, PL0 and PL1. The present invention does not require Virtualization Extensions and it includes embodiments with and without Virtualization Extensions.

The ARM Security Extensions extend the processor architecture to provide hardware security features that support the development of secure applications, by providing two processor security states. Common OS's (213-214) and user applications (211-212) are running in Normal World when the processor is in Non-secure state (201). A Secure OS or module (209) and its trusted applications (210) are running in Secure World when the processor is in Secure state (202). The most important system control resources are only accessible from the Secure World.

Some of the ARM processor implementations do not include the Security Extensions. The present invention is applicable only to computer systems based on ARM processors with Security Extensions.

Each security state has its own system registers and memory address space. The execution privilege levels are defined independently in each security state. There is no relationship between the Secure PL0 (207), Secure PL1 (208) and Non-secure PL0 (203), Non-secure PL1 (204) privilege levels.

The Monitor mode (206) exists only in the Secure state, and supports transitions between Secure and Non-secure state. Software Context switcher (216) running in Monitor mode has access to both the Secure and Non-secure copies of system registers.

Secure Monitor Call (SMC) is available only from software executing at Non-secure PL1 mode or higher. A SMC call from Non-secure PL1 mode could be intercepted by Hypervisor Trap (221) and processed inside hypervisor. A SMC is always taken to Secure Monitor mode. Interrupt Requests (IRQ), Fast Interrupt Requests (FIQ), and External abort exceptions can be configured to be taken to Secure Monitor mode.

It is important that Non-secure PL2 mode is less privileged than the Secure PL1 mode. Secure PL1 mode can change the configuration and control settings for Non-secure operation in all modes, but Non-secure modes can never change the configuration and control settings for Secure World.

The present invention provides requirements for software running in the Secure World and optionally in the Hyp mode. Thus while the main purpose of ARM Security Extensions is isolation between Normal and Secure Worlds, the present invention provides the innovative approach to employ these Security Extensions to isolate OSs running within the Normal World.

FIG. 3 (background art) illustrates a generic method of memory access control based on CPU modes. In ARM architecture it is possible to set access rights to different memory regions (305-310) from system memory map (304) for different CPU mode sets (301-303). To achieve this several hardware modules are integrated into processor: MMU, TZASC and TZPC. Additionally, several processor manufactures added their own extensions to enhance memory control functionality. For example, as mentioned before, Freescale iMX6 processor uses CSU instead of TZPC to provide more granular access control and additional security functionality.

The most common is the MMU and it is currently using in all popular OSs to separate system and user applications memory. The MMU is controlled by system control registers that can also disable the MMU. When the MMU is enabled, the processor works with virtual addresses and MMU works with memory system to translate virtual addresses to physical addresses. MMU divides memory into pages (4 KB, 64 KB, 1 MB, and 16 MB) and each page can have its own memory access attributes.

The ARM processor enhanced with Security Extensions has a separate and independent MMU for Secure and Normal Worlds.

The ARM processor has two stages MMU in Normal World when it is enhanced with Virtualization Extensions. Instead of direct translation from a virtual address to a physical address, the MMU performs first stage translation from a virtual address to an Intermediate Physical Address (IPA) according to MMU settings at Normal World PL1 and then performs second stage translation from IPA to a physical address according to MMU settings at Normal World PL2. This allows effective hypervisor memory management systems to be built.

The purpose of a TZASC module is separation of Secure World memory from Normal World memory. It works with random-access memory (RAM) only and can be configured from Secure World only. As the MMU, it divides memory into regions and each region has its own memory access control attributes. The TZASC works totally independently from MMU even when MMU is disabled. The TZASC works with physical addresses and doesn't have any MMU virtual address awareness.

Although the main purpose of TZASC is the memory separation between Secure and Normal Worlds the presented invention employs the TZASC module to implement memory separation between different Normal World OS's on the computing systems that does not use Virtualization Extensions, doing so in the following way: during switching between OS's, the deactivating OS memory is marked as Secure and the activating OS memory is marked as Normal World memory. This method prevents unauthorized RAM access from one Normal World OS to another Normal World OS.

The same method can be used on computing systems that use Virtualization Extensions of an ARM processor. Combined with two stages of the MMU, it will allow layered memory access control and can prevent some of the attacks that target hypervisors. In this case, a hypervisor scheduler is running in Secure World and performs TZASC configuration and other tasks are running in the less privileged PL2 mode.

Since the TZASC module works only with RAM, the TZPC is used to control access between Secure and Normal Worlds for memory regions where peripheral hardware device controllers and interfaces are mapped. Also TZPC is used to control on-chip RAM access control in some ARM processors implementations. The TZPC could be configured from Secure World only. Different ARM processors have different peripheral devices and interfaces, so TZPC regions are predefined and implementation dependent and only access rights to these regions can be changed in the runtime.

Despite the fact that TZPC settings are recommended to be set at the boot time only (see Section 3 Functional description of PrimeCell Infrastructure AMBA 3 TrustZone Protection Controller Technical Overview) and it is used to separate access to devices between Secure and Normal World, the present invention reconfigures TZPC in the runtime and uses TZPC to provide controlled access to peripheral devices and maintain the isolation between OS's running in Normal World. These methods are further discussed in the FIG. 5-7 descriptions.

DETAILED SPECIFICATIONS AND DESCRIPTION (WITH REFERENCE TO DRAWINGS)

FIG. 1 illustrates a computing system with fully hardware isolated runtime environments or in other words "Domains"

(104-106) for multiple OS's (113-115) running on a single processor. These OS's may run in parallel using hypervisor or run sequentially using either system reboot or a sleep/resume switching mechanism. The embodiment presented isolates Domains and prevents unauthorized access from one Domain to another, as follows.

The hardware-enforced mechanism provided in the invention can be configured by relatively simple and easily verified trusted boot procedure and also can uniquely identify each OS which restrains only its own resources. This can be achieved using a trusted system boot loader mechanism that is currently implemented in most ARM processors and described in prior art, for example in Patent No. US20090204801A1. Such a system based on ARM processors uses a first stage system boot loader that is located inside on-chip read-only memory (ROM) to ensure integrity and authenticity of the external boot code and prevents system start using unauthorized code. This creates a trusted computing base where after boot completion, the system is in determined state that cannot be altered. After initial boot completion, other critical system components are loaded and could be protected with a "chain-of-trust" procedure—i.e. next component is loaded, verified and only after the successful completion of these steps is then executed.

In the present invention, the first loading component is the trusted system boot loader (119) that is implemented and signed according to particular ARM processor requirements for a trusted system boot. By default the ARM processor starts in the most privileged state—Secure State PL1 (see FIG. 2 and corresponding description). Thus a trusted system boot loader is executed in this state and has full access to all hardware.

Trusted system boot loader code is a part of Secure Monitor Module (SMM) (118) software. The main purpose of the trusted system boot loader is a basic system hardware initialization and loading of the rest of SMM using "chain-of-trust" procedure.

At the next step, the SMM loads each OS into a predefined memory region using "chain-of-trust" procedure and each OS receives a unique identifier that will be used in the security policies and hardware Access Control Lists (ACL). In some of embodiments only one OS will be loaded during computer system boot and the rest of the OSs' loading process will be delayed and triggered by event, for example specific user action.

The SMM may be implemented as a static library or a micro-kernel. In a preferred embodiment the SMM should have at least three modules: the trusted system boot loader discussed earlier, Device Control Module (122), and OS Switcher/Hypervisor (123).

The OS Switcher/Hypervisor module is responsible for system switch from one OS to another and for switching between OS and SMM execution. In the present invention, it does not matter what type of OS Switcher/Hypervisor module implementation is used; the essential function is that at any moment of time, the SMM is aware of which OS is active and can adjust security policy for memory and system hardware.

The present invention is applicable to three types of OS Switcher/Hypervisor: (1) a full system reboot is required in order to switch from one OS to another as is described in prior art, for example in U.S. Pat. No. 4,626,986A; (2) a hibernation based OS switch where one OS is placed in sleep mode as the second OS resumes activation, as is described in prior art, for example in U.S. patent Ser. No. 07/356, 677B1, No. U.S. patent Ser. No. 08/042,117B2 or Patent Application No. 20010018717; (3) a hypervisor where parallel OS execution is emulated as is described in prior art, for example in U.S. Pat. No. 4,253,145A. The hypervisor embodiments include both bare metal Type 1 hardware virtualization and hosted Type 2 virtualization where the host OS is running in Secure World or Normal World.

Device Control Module utilizes ARM processor Security Extensions such as TZPC or hardware Virtualization Extensions to control access level to particular hardware resources, such as to internal hardware devices (117), hardware interfaces (125) and external peripheral devices (116) from OS's that are running in Normal World. Types of control for hardware resource interfaces are described below in the descriptions of FIGS. 5-7.

To enhance security, the optional Watchdog/Audit (124) functionality can be added into the SMM. The primary methodology is to employ code running in the more privileged level to validate the state and integrity of the code that is running in the less privileged level. In this fashion, Secure World software can validate software running in a Normal World hypervisor and OS's. A hypervisor that is running at PL2 can validate OS's and user applications that are running at PL1 and PL0 correspondingly. Finally an OS running at PL1 can validate user applications running at PL0. Alternatively, self checks generally do not increase security level because when software checks itself, the check could be easily disabled when an attacker obtains access to the corresponding privilege level.

Another important security enhancement is the Crypto Provider (121) implementation that allows indirect and controlled work with cryptographic keys. For example, a TPM as it is described in prior art, U.S. Pat. No. 8,375, 221B1 or other implementations could be used. Also the Crypto Provider can be used to simplify integrity and authenticity checks and provide hardware accelerated encryption for Normal World OS's.

Despite the fact that full isolation between OS's is the target in many security environments, practical scenarios may require some limited and controlled data exchange between OS's. In this case limited communication between OS's will be allowed through SMM Controlled OS communication channels (120) according to security policy where content analysis, filtering, conversion to safe formats and encryption mechanisms are used.

FIG. 4 illustrates memory isolation between OS's. As discussed earlier regarding FIG. 3 (background art) description: the ARM processors with Security Extensions use MMU, TZASC, TZPC or processor manufacture specific modules with similar functionality for memory access control based on processor mode privilege level and Secure/Non Secure state.

In the present invention, the SMM software runs in the Secure World and if the computing system uses processor Virtualization Extensions, then SMM uses PL2 Hyp Mode also. SMM software located in the SMM memory region (402) and has full access to all system's memory. Please note that here that the memory region term means one or more continuous memory segments.

It is important that system memory map (400) or, in other words, system address space can be divided into two categories—general purpose RAM where SMM and Normal World OS's are located (402-405) and a processor-specific hardware interfaces region (401). General purpose RAM access control is configured through TZASC and MMU. The memory region access control for hardware interfaces is configured through TZPC. In the ARM architecture, access to TZASC and TZPC configuration (406) is allowed only from Secure World (407) and denied from Normal World (408).

Additionally MMU stage 2 can be used for memory access control on the computing systems that use Virtualization Extensions of ARM processor. In this case, MMU stage 2 (410) is configured by the SMM in the Hyp mode (411). It is important that in ARM architecture MMU stage 2 cannot be configured from Normal World PL0 and PL1 modes (412).

In the present invention memory access control is used for separation of OS runtime environments. RAM access control implementation depends on type of OS switching mechanism used but in all cases, the SMM Device Control Module controls access from an active OS to hardware interfaces through TZPC, according to security policy.

In embodiments where the OS switching process is implemented through system reboot, there is SMM and one OS only loaded in the system's memory. In this case, a sequential approach should be used: (1) the active OS can use all RAM except the SMM region. (2) During a switch when a computing system is rebooted, the system's memory is reinitialized or, in other words, zeroized and the next activating OS can use all RAM except the SMM region. Please note that in this embodiment the SMM Device Control Module still provides the unique ability to protect inactive OS data located on the computing system storage or to allow granular access to system hardware.

In embodiments where the OS switching process is hibernation-based, such that one OS is placed in sleep mode as the second resumes activation, the presented Access Control Table (409) should be used for memory access control as follows. During switching between OS's, the deactivating OS memory is marked as Secure in TZASC and the activating OS memory is marked as Normal World memory. This method fully prevents unauthorized RAM access from one Normal World OS to another Normal World OS.

The same Access Control Table and method can be used in the embodiments that use Virtualization Extensions of the ARM processor. Combined with two-stage MMU whereby MMU stage 2 is configured in the Hyp mode, the activating OS can access only its own RAM, and other OS RAM is made hardware-inaccessible. In this case both MMU stage 2 and TZASC can be used for RAM access control. Additionally hypervisor traps can be used in the SMM Device Control Module to implement granular access to system hardware.

The SMM Device Control Module controls access from the active OS to hardware interfaces through TZPC according to security policy. In the present invention, in order to maintain OS isolation, all computer system hardware resource access should be implemented in one of the following ways: exclusive access, sequential access, paravirtualization or hardware virtualization. It is critically important that there is no allowed hardware resource shared use between OS's without Device Control Module control.

FIG. 5 illustrates usage of a TZPC or similar hardware module to grant exclusive access to a hardware device from one and only one of the device OS's. Note that according to ARM architecture, access to a hardware device is always granted from Secure World (501) but in a preferred embodiment, it is not used by SMM software.

In the exclusive access case, only one OS (503) is configured to have direct access to the hardware device controller (502) or other type of device interface. Other OS's (504) do not have access to the device controller. In order to achieve this effect, the subroutine (505) and Access Control List (506) are used during OS switching. (Exclusive access mode provides the optimal security performance but may not be always practical.) In the case of OS switching through system reboot, exclusive mode access to hardware can be granted to more than one OS.

FIG. 6 illustrates sequential access to a hardware device from several computing system OS's where direct access to the hardware device interface (602) is allowed from both Secure World (601) and Normal World (603). There is no need to use TZPC or similar hardware module for access control. In this case, the hardware device loses its state each time there is OS switching. In order to achieve this effect the subroutine (604) is used during OS switching. It is essential that in order to maintain isolation between OS's, the hardware device must perform full reset and zeroize all internal memory and state during OS switching.

The sequential access scenario is preferably used in embodiments without hypervisor, when switching between OS's is a relatively rare event and is made through system reboot or sleep/resume procedure. There is no performance drawback in this mode except device reset can increase OS switching time.

FIG. 7 illustrates a virtualization/paravirtualization approach using a storage controller example. The TZPC or similar hardware module is used for access control. Direct access to Storage Controller (709) is forbidden from any Normal World OS working at PL1 and PL0 (711). Direct access is allowed only from SMM running in Secure World or in the Hyp Mode (710).

In case of a paravirtualization approach, in order to work with the storage indirectly, the Normal OS code is modified to call SMM functions instead of direct work with a storage controller. In a case of pure virtualization, hypervisor traps handled inside the SMM can be used in order to organize indirect work with the storage controller.

In preferred embodiments when SMM software receives the request for operation with data located on the storage device, the SMM checks the Access Control List (712) to assure that requested data belongs to the active OS partition (703-708). Access to bootloader partition is forbidden from all Normal World OS's. Additionally, more granular security policy can be applied based on type of the access—read, write or erase. For example OS system partitions (703,705 and 707) can be made read-only—only the read operation is allowed if data belongs to these regions. This approach allows full isolation of data located on storage between OS's.

It is important that the described paravirtualization approach can be used with or without hypervisor. This provides attractive flexibility and control over device usage.

Please also note that a sequential access approach cannot be used in the storage access control scenario because other OS partitions of the storage should not be accessible for the active OS, and a shared file system can readily become the source of malware proliferation within a device; therefore direct access to the device is not provided. On the other hand, a direct exclusive access approach is applicable if the computing system uses several storage devices. In this case, storage 1 will be exclusively accessed from OS1, storage 2 will be exclusively accessed from OS2, etc., and isolation will be maintained.

All device access control methods described above (exclusive access, sequential access, paravirtualization or virtualization) can be used together in one computer system for different devices or different types of devices. For example, access to the internal device storage can be paravirtualized, while one OS has exclusive access to external storage (SD card slot) and other OS's do not have access to the SD card slot at all, etc.

Security and Virtualization Extensions of current ARM processors allow isolated runtime environments to be established using the method presented in this invention.

I claim:

1. A method of preventing cross-contamination between operating systems (OS's) running on an ARM processor that has Security Extensions, the method comprising:
   instantiating SMM software through secure boot process—creating trusted computing base by using hardware-enforced secure boot process that allows running only digitally signed computer system bootloaders and ensures bootloader code integrity and authenticity;
   creating multiple fully-isolated runtime environments using hardware Security Extensions of an ARM processor controlled by SMM software running in Secure World with other OS's running in Normal World, using the following steps:
   uniquely identifying each OS starting from system boot stage;
   performing forced control transfer between OS's using SMM software OS switching mechanism only;
   disabling access from any OS to memory regions where the SMM is located using TZASC, TZPC and MMU hardware modules;
   enabling access for a currently active OS to its own RAM regions and disabling access to all other RAM regions using TZASC and MMU hardware modules, whereby all RAM is marked as Secure Memory except active OS RAM regions;
   causing SMM to use one of the following isolation methods for one corresponding hardware device that are present in the computer system: exclusive direct access, sequential direct access, paravirtualization indirect access or virtualization indirect access, such that all hardware devices inside the computer system use one of above methods, and whereby different devices (or types of devices) can use different isolation methods in one computer system;
   whereby in case of exclusive direct access, the SMM software sets hardware device access level during OS switch to access from Secure World only for all OS's except selected ones where access is set to access from both Normal and Secure World;
   whereby in case of sequential direct access, the SMM software sets the hardware device access level to access from both Normal and Secure World in conjunction with corresponding device internal state reset during OS switching;
   whereby in case of paravirtualization indirect access, the SMM software has exclusive direct access to the hardware device, and Normal World OS's are modified to work with these hardware devices indirectly through SMM calls;
   whereby in case of virtualization indirect access, the ARM processor has Virtualization Extensions, the SMM software has exclusive direct access to the hardware device, and when Normal World OS's perform access attempt to the hardware device, this attempt is intercepted through Hyp trap and handled in the SMM;
   causing SMM to enable exclusive direct, paravirtualization indirect or virtualization indirect access to storage devices from OS's;
   whereby in case of paravirtualization indirect or virtualization indirect access to the storage, the access is performed according to ACL where access is granted from an active OS to its own storage partitions and access forbidden from an active OS to other OS storage partitions; and
   whereby in case of exclusive direct access to the storage each OS has its own storage under exclusive access and no shared storages with parallel or sequential access are allowed.

2. The method as claimed in claim 1, where the ARM processor has Virtualization Extensions and the OS switching software is a hypervisor type 1 software running in Normal World PL2 CPU mode.

3. The method as claimed in claim 1, where the OS switching software is a hypervisor type 2 and Secure World software serves as a host OS and Normal World OS's serve as guest operating systems.

4. The method as claimed in claim 1, where the OS switching software is software running in Secure World using hibernation mechanics to switch between OS's, one OS placed in sleep mode as a second resumes activation.

5. The method as claimed in claim 1, where OS switching software comprises software running in Secure World and uses full system reboot to switch between OS's.

6. The method as claimed in claim 1, where critical system components are protected with the "chain-of-trust" procedure such that a next component is loaded, verified, and only after the successful completion of these steps is then executed.

7. The method as claimed in claim 1, where all computer system debug facilities capable of accessing SMM assets are disabled.

8. The method as claimed in claim 1, where access is forbidden from any OS to bootloader and SMM storage partitions.

9. The method as claimed in claim 1, where access is set to read only from an active OS to its system partitions located on the storage device.

10. The method as claimed in claim 1, where limited communication between OS's is allowed through controlled OS communication channels according to a security policy where controlled OS communication channels use content analysis, filtering, modification and conversion to safe formats and cryptographic mechanisms.

11. The method as claimed in claim 1, where watchdog functionality is added into the SMM for validation employing code running in the more privileged level the state and integrity of the code running in the less privileged level.

12. The method as claimed in claim 1, where TZPC and/or TZASC are replaced to their vendor specific analogs.

* * * * *